(12) United States Patent
Hindawi et al.

(10) Patent No.: US 8,903,973 B1
(45) Date of Patent: Dec. 2, 2014

(54) PARALLEL DISTRIBUTED NETWORK MANAGEMENT

(75) Inventors: David Hindawi, Berkeley, CA (US); Orion Hindawi, Berkeley, CA (US); Lisa Lippincott, Berkeley, CA (US); Peter Lincroft, Albany, CA (US)

(73) Assignee: Tanium Inc., Berkeley, CA (US)

( * ) Notice: Subject to any disclaimer, the term of this patent is extended or adjusted under 35 U.S.C. 154(b) by 493 days.

(21) Appl. No.: 13/107,625

(22) Filed: May 13, 2011

Related U.S. Application Data

(63) Continuation-in-part of application No. 13/084,923, filed on Apr. 12, 2011, which is a continuation-in-part of application No. 12/412,623, filed on Mar. 27, 2009, now Pat. No. 8,086,729.

(60) Provisional application No. 61/323,733, filed on Apr. 13, 2010, provisional application No. 61/113,060, filed on Nov. 10, 2008.

(51) Int. Cl.
G06F 15/16 (2006.01)
G06F 15/173 (2006.01)

(52) U.S. Cl.
USPC .......................................... 709/223; 709/217

(58) Field of Classification Search
CPC ................................ H04L 41/00; H04L 43/10
USPC ........................................ 709/217, 243, 223
See application file for complete search history.

(56) References Cited

U.S. PATENT DOCUMENTS

| | | | |
|---|---|---|---|
| 6,049,828 A | 4/2000 | Dev et al. | |
| 6,879,979 B2 | 4/2005 | Hindawi et al. | |
| 7,555,545 B2 | 6/2009 | McCasland | |
| 7,600,018 B2 | 10/2009 | Maekawa et al. | |
| 7,720,641 B2 | 5/2010 | Alagappan et al. | |
| 7,761,557 B2 | 7/2010 | Fellenstein et al. | |
| 7,844,687 B1 | 11/2010 | Gelvin et al. | |
| 8,078,668 B2* | 12/2011 | Moreau | 709/203 |
| 8,185,615 B1 | 5/2012 | McDysan et al. | |
| 8,271,522 B2 | 9/2012 | Mehul et al. | |
| 8,504,879 B2 | 8/2013 | Poletto et al. | |
| 2002/0073086 A1 | 6/2002 | Thompson et al. | |
| 2003/0212676 A1 | 11/2003 | Bruce et al. | |
| 2005/0108389 A1 | 5/2005 | Kempin et al. | |
| 2007/0211651 A1 | 9/2007 | Ahmed et al. | |
| 2008/0082628 A1* | 4/2008 | Rowstron et al. | 709/217 |
| 2008/0133582 A1 | 6/2008 | Andersch et al. | |
| 2008/0263031 A1 | 10/2008 | George et al. | |
| 2008/0288646 A1 | 11/2008 | Hasha et al. | |
| 2009/0319503 A1 | 12/2009 | Mehul et al. | |

* cited by examiner

*Primary Examiner* — Aaron Strange

(74) *Attorney, Agent, or Firm* — Morgan, Lewis & Bockius LLP

(57) ABSTRACT

A method of parallel processing by networked devices, in which distributed data in a network is accessed in parallel to provide results. Commands and queries by a user station define a set of such distributed data. The networked devices access the distributed data in portions, individually process each portion, conduct peer-to-peer communication to aggregate results from processing each portion, and individually determine whether and when to report results. Making effective use of network assets (such as processing and storage at each node), making effective use of concurrency of network assets, limiting bandwidth use between network assets and user stations, and limiting use of assets (such as processing and storage) at user stations.

29 Claims, 1 Drawing Sheet

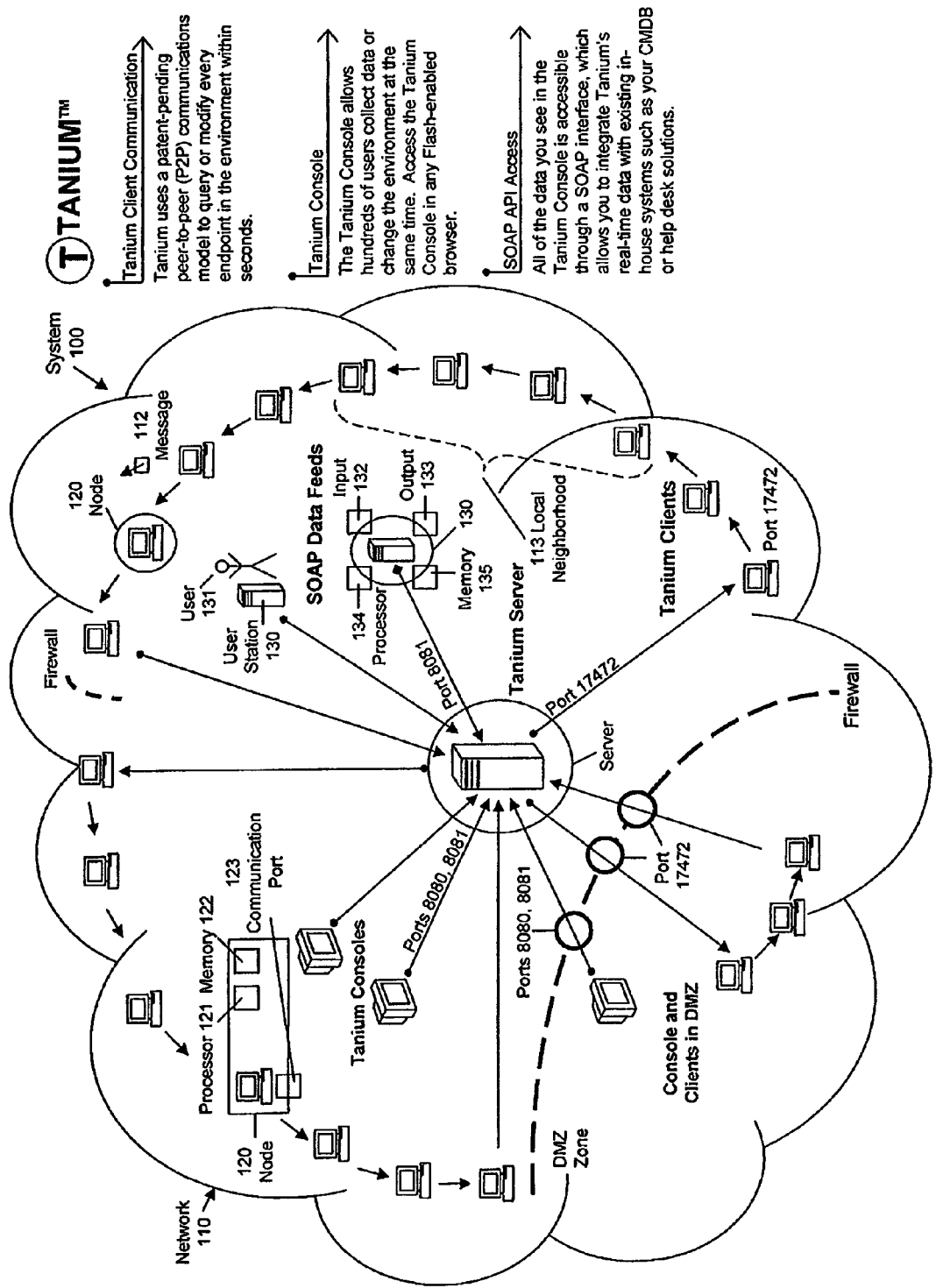

PARALLEL DISTRIBUTED NETWORK MANAGEMENT

RELATED APPLICATIONS

This application is a continuation-in part of U.S. patent application Ser. No. 13/084,923, filed Apr. 12, 2011, entitled "Large-Scale Network Querying and Reporting", which claims the benefit of U.S. Provisional Patent Application Ser. No. 61/323,733, filed Apr. 13, 2010, and which is a continuation-in-part of U.S. patent application Ser. No. 12/412,623, filed Mar. 27, 2009, entitled "Distributed Statistical Detection of Network Problems and Causes", which claims the benefit of U.S. Provisional Patent Application Ser. No. 61/113,060, filed Nov. 10, 2008.

The disclosures of U.S. patent application Ser. No. 12/412, 623 and U.S. patent application Ser. No. 13/084,923 are hereby incorporated by reference in their entireties. These documents are sometimes referred to herein as the "incorporated information."

BACKGROUND

In a network of communicating machines having relatively large numbers of devices, such as for example an enterprise network or other computer network, the amount of computing assets, and the amount of available data for use by those computing assets, grows rapidly with the size of that network. Managing such networks, including obtaining information regarding those assets and data, and modifying allocation of those assets and data, can be a Herculean task, often requiring substantial computation and communication.

One known problem in the art is that the computation and communication needed to manage such a network is often not readily available, and even if available, would take relatively large amounts of time to perform management operations. This has the effect that latency in providing answers to questions about the network, or in performing modifications to the network, is relatively high, with the effect that real-time management of such networks can be infeasible when the network is relatively large. It typically takes more time to collect information about the status of devices coupled to the network than it takes for those statuses to change, making collection of that information impractical, inaccurate, untimely, and otherwise unsatisfactory. It typically takes a relatively large amount of communication and processing resources to bring that information to the attention of a network operator, such as someone operating a network control server.

Known systems attempt to ameliorate these issues by performing some degree of aggregation or processing of data at intermediate control levels, with the effect that there might be several levels of indirection before information from a device is finally delivered to the network control server. These techniques do not scale well, so that a network with (say) 100,000 nodes would likely still take several hours or more to report the status of individual ones of those nodes, or even of an aggregate thereof. In that time, many nodes will likely have changed their status, making that report obsolete.

Known systems also amass information about network devices into one or more relatively large databases, so that network operators can query those databases for information about the network. These techniques also do not scale well, so that a relatively large network would have enough interesting data to swamp the operations of that database. One result is that only relatively few database queries can be made within resource limits of the database or its servers.

SUMMARY OF THE DESCRIPTION

We provide a network management system in which nearly all computation and data transfers are performed in parallel at leaf nodes of a network to be managed, with the effect that resource demands on the network for management services are nearly zero, and with the effect that information is propagated between leaf nodes and a single server, and between that single server and managers (and other network users) in real time and with sufficient alacrity that status reports are accurate, network changes can be made substantially atomically, and users can manage the network dynamically. Distributed data in the network is accessed in parallel by individual network nodes, with management functions being performed in parallel by those nodes. For example, each node might have a portion of the distributed data to be accessed, each such portion being locally available at each such node without long-distance communication through the network, with the effect that each such node can perform computation and possible modification of that data without need for using extensive communication resources from the network.

Since each node performs only a relatively small portion of the assigned management functions, the amount of resource drain upon each such node is relatively small; when there are a relatively large number of network nodes, the amount of resource drain can be relatively large without the aggregate resource drain on the network being noticeably large. Since the network nodes collectively perform the management functions for the network, there is no substantial need for a relatively resource-intensive network-management system separate and apart from the network. In such a peer-to-peer configuration each node can perform its own processing operations (such as for example, data collection, computation, and data distribution) with only relatively minor coordination between nodes. For example, each node can select only a portion of a relatively large problem to work on, and delegate other portions of the problem to other nodes. In one embodiment, peer-to-peer coordination involves only a relatively small amount of communication bandwidth, computing power, or memory space at each involved node.

Peer-to-Peer.

In one embodiment, nodes dispose themselves in a peer-to-peer configuration, with the effect that there is no substantial need for an external network manager to organize the nodes. In one example, a peer-to-peer configuration includes a substantially non-hierarchical system in which each node is distributed at an edge, with only a single server at a center or root of the system. Effectively, this forms a one-level tree, in which the single server serves as the root of the tree, while each node is disposed on the one level which includes all the leaves of the tree.

In such embodiments, nodes can dispose themselves in a substantially linear orbit about the server, in which each such node seeks to communicate only with those other nodes which are "nearby" in the linear orbit, sometimes referred to herein as a "local neighborhood" or a "neighborhood". For example, a neighborhood might include only a few (such as for example 10 or 20, or another number selected as a system parameter) nodes further along a linear orbit. Similarly, a neighborhood of a particular node might include only a few nodes preceding that particular node along that linear orbit, possibly a different number of nodes following that particular node further along in the linear orbit. As noted in the incorporated information, a linear orbit might be disposed by ordering each such node in response to its hardware address, such as for example its MAC address or other network address. Such addresses might be selected as they are viewed either from inside or outside the network. In such embodiments, where nodes are separated by a firewall or other communication break, communication returns from the leaf level, where the break occurs, back to the server, and from the server out to another node at the leaf level, to reenter the linear orbit.

This has the effects that (1) each node need only know the address of only a few relatively local nodes, and of the server;

(2) each node communicates primarily with only a few relatively local nodes, with the effect of using relatively available and relatively inexpensive communication bandwidth; and (3) each node can easily insert itself into, or remove itself from, a linear orbit; determine when a new node inserts itself into the linear orbit; and determine when a node in its neighborhood leaves the linear orbit. For example, if a node enters the linear orbit, it can rapidly discover its neighborhood with reference to the network addresses of other nodes. Similarly, if a node is removed the linear orbit, other nodes can rapidly discover that the node has left with reference to failure of a response from the node that was removed.

In one embodiment, the knowledge that nodes have with respect to their neighborhoods allows them to rapidly determine what other nodes in their neighborhoods are doing, to rapidly determine the status of other nodes in their neighborhoods, and to rapidly direct other nodes in their neighborhoods to perform actions (either individually or in cooperation). Parallel Operation.

In one embodiment, commands or queries from users each define a set of such nodes to be operated in parallel, and the distributed data upon which those nodes operate. For example, commands or queries from users might define a subset of nodes in the network having selected properties (such as, those nodes having particular installed operating systems, or having particular installed software applications, or exhibiting particular known behavior such as memory leakage). The defined subset of nodes are directed, in parallel, to perform operations defined by such commands or to determine answers to such queries, with the effect that the defined subset parallelizes the commands or queries directed by users, and that those commands or queries can be completed much more quickly than in serial or by a server.

Similarly, the data accessible by the defined subset of nodes is accessed in parallel, with the effect that the need is greatly reduced for communication resources for distributing that data through the network. Results from each node in the defined subset are aggregated by peer-to-peer communication. Each such node need only communicate relatively locally within the network for its results to be collected, aggregated, and reported. For example, when information is collected from a set of such nodes, that information can be aggregated peer-to-peer. Similarly, when commands are executed by a set of such nodes, acknowledgement that those commands were executed can be aggregated peer-to-peer.

This has the effect of making effective use of network assets (such as processing and storage at each node), making effective use of concurrency of network assets, limiting bandwidth use between network assets and user stations, and limiting use of assets (such as processing and storage) at user stations. This also has the effect that latency in providing results is relatively minor, with the effect that management of the network can proceed in substantially real-time. For example, a network having several hundred thousand nodes can perform a management command or a management query in only a few seconds. This also has the effect that substantial additional network infrastructure is not needed. There is not any requirement for layers of intermediate servers to perform aggregation or distribution within the network, nor is there any requirement for allocating any substantial fraction of network communication bandwidth for management.

Rights Management.

In one embodiment, each node in the defined subset has sufficient computational power to manipulate results before and after communication so that those results can be restricted to authorized users. Peer-to-peer communication is encrypted and decrypted using a public-key cryptosystem and a secure hash code. In such embodiments, the server provides the certification authority and the public key for the network, with the effect that each node has direct access to those codes needed to authenticate information from other nodes. For example, when data is downloaded from the server to nodes, each node can determine, using a public-key cryptosystem and a signature from the server, whether the data it receives is accurate and authentic.

Data, commanded modifications, and query results are maintained confidential to only those nodes and only those users who are authorized to see those data and query results, or are authorized to modify those data and make those commanded modifications. This has the effect that management users can be authorized for only a subset of possible management functions. For example, some users might only be authorized to review the number of assets assigned to particular uses (such as for example, monitoring whether license usage is within contract limits), while other users might only be authorized to review whether there are unusual system events ongoing (such as for example, malware spreading in the network), while still other users might only be authorized to upgrade software applications (such as for example, software applications obtained from designated vendors), while yet other users might be authorized to make other and further changes to the network (such as for example reallocating assets from one department to another). Individual users at user stations might each be associated with distinct sets of authorized rights.

Scanners.

In one embodiment, a set of network nodes (possibly a subset, but typically substantially all of them) are assigned the task of scanning their local region of the network for managerial information. These scanning nodes might be changed from time to time, with the effect that no individual node need be excessively burdened with this task. That managerial information might include the identities and locations of network features improperly or inadequately configured for network management. For example, each node might query the nodes in its neighborhood whether those nodes have proper antivirus or other anti-malware software installed.

Those network features might include communication links that are broken or otherwise not adequately configured, network nodes that are crashed, disconnected, or otherwise not adequately configured, and otherwise. While each individual scanning node does not need to review any large portion of the network, collectively those scanning nodes can cover the entire network, having the effect of revealing any such deficient links or nodes with relatively little resource use.

Shards.

As noted above, user stations might upload large data units to the server. The server selects some set of nodes for download of those large data units (or fractions thereof). As each node receives the data unit (or its portion thereof), that node randomly or pseudo-randomly selects a fraction of the shards for that data unit to maintain at the node. The node communicates the data unit (or its portion thereof) to a next node in its neighborhood. In one embodiment, user stations, external to the network, communicate relatively large data units with the server. Examples of communicating such large data units might include distributing updates to software applications assigned to execute on network nodes, collecting transaction history or other logging files collected by network nodes, or otherwise. These large data units are broken into individual shards, which are distributed throughout the network (or aggregated from within the network) using peer-to-peer communication.

In such embodiments, these large data units are communicated between user stations and the server, with the effect that the server need be the only device that bears a relatively heavy communication load. The server downloads these large data units to a relatively small set of selected nodes, each of which maintains a subset of those shards, selected randomly or pseudo-randomly from the set of all shards in the data unit. The number of such shards maintained by each node might be responsive to the number of such shards, the amount of memory the node selecting those shards has to maintain them, or other factors.

In such embodiments, each node selects the shards it maintains independently of whether those shards are maintained by other nodes, with the effect that if a fraction of the network is not operational, not reachable, or otherwise incapacitated, the likelihood that at least one copy of each shard is maintained in that remaining fraction of the network that is operational and reachable is independent of the nature of whatever failure mode occurred. All nodes coupled have relatively easy access to all shards within their own local neighborhood, so it is generally adequate for a neighborhood to maintain only a few copies of each such shard. If a particular neighborhood is missing a shard, its nodes can request that shard from the server or from other neighborhoods, with the effect of distributing or collecting data for communication with user stations with relatively little resource use.

Dashboards.

In one embodiment, a set of relatively frequently-asked network queries (FAQ's or "frequently-asked queries") are automatically injected into the network from time to time, with the effect that those FAQ's are performed in parallel by nodes as if they were explicitly instructed by network users. Responses to these FAQ's are cached, and user stations maintain a user interface including a dashboard of the cached responses. This has the effect that many such queries need not be initiated by users, as answers are already maintained available on the dashboard. In such embodiments, dashboards are configurable by users, with the effect that users can maintain a view of relatively fresh responses to such FAQ's with less latency than if those FAQ's were initiated only when a response was desired.

Since information collection is performed in parallel and distributed among leaf nodes of the network, relatively little resource use need be expended, with the effect that network stations can present the answers to many such FAQ's in real time. Similarly, computations responsive to those answers can be maintained on the dashboard, including aggregate values from multiple such queries, trend lines, and other statistical information.

Similarly, a set of audit or compliance rules are also automatically injected into the network from time to time, with the effect that those rules are also performed in parallel by nodes as if they were explicitly instructed by network users. Known auditing and compliance schemas typically have dozens or even hundreds of such rules, each of which is intended to assure that the network is operating within strictures imposed by regulation, contract, or administrative policy. For example, it might be a contract requirement for the enterprise operating the network that they have no more than 5,000 copies of Microsoft Excel in use at any instant. Since information collection and distribution is performed in parallel and distributed among leaf nodes of the network, relatively little resource use need be expended, both (1) to determine that the network is in compliance, and (2) to assure that network nodes attempting to initiate excess uses are disallowed from doing so.

Generality of the Techniques

Technologies shown or suggested by this description should be thought of in their most general possible form. This includes, without limitation, the following:

The phrases and terms "causing," "directing," "instructing," "to cause," "to direct," "to instruct" (and similar phrases and terms) generally indicates any technique in which one or more first devices or methods induce one or more second devices or methods to take action, whether or not that action is assured (for example and without limitation, including a message, a posted change to a data structure, or otherwise).

The terms "command" or "instruction" (and similar phrases and terms) generally indicate any information or other arrangement or disposal or matter or energy, having the property of being interpretable by a computing device, or other device, to perform operations (possibly conditional operations, parallel operations, pipelined operations, or other dispositions of method steps or operations as might be known or developed in the many fields of computing science), whether or not responsive to inputs, states or state-changes, or other instructions, from any source whatever, or otherwise, or combinations or conjunctions thereof.

The phrases and terms "constantly," "continually," "from time to time," "occasionally," "periodically" (and similar phrases and terms) generally indicate any case in which a method or technique, or an apparatus or system, operates over a duration of time, including without limitation any case in which that operation occurs only part of that duration of time. For example and without limitation, these terms would include, without limitation, methods which perform an operation as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The phrases and terms "data," "information" (and similar phrases and terms) generally indicate any form of bits/digits or values (whether analog, digital, or otherwise), collection or content, coincidence or correlation (whether causal or otherwise), evidence or logical tendency (whether probabilistic, pseudo-probabilistic or otherwise), or other indication of any kind from which a computing device, Turing-equivalent equivalent device, user, Artificial Intelligence, or other thinking being, might be able to draw conclusions.

The phrases and terms "data structure," "database" (and similar phrases and terms) generally indicate any element in a computing device, or storage device, or other device, capable of maintaining or identifying information (for example but without limitation, data or instructions, status information, synchronization information, and combinations or conjunctions thereof) for possible use by a computing device or process.

The phrases and terms "distribute," "to distribute" (and similar phrases and terms) generally indicate any case in which one or more first devices or methods, induce information (for example but without limitation, data or instructions) to appear at one or more second devices or methods, whether or not that information is assured to appear thereat (for example and without limitation, including a message, a posted change to a data structure, or otherwise).

The phrases and terms "effect," "with the effect of" (and similar phrases and terms) generally indicate any natural and probable consequence, whether or not assured, of a stated arrangement, cause, method, or technique, without any implication that an effect or a connection between cause and effect are intentional or purposive.

The phrases and terms "methods, physical articles, and systems," "techniques" (and similar phrases and terms) generally indicate any material suitable for description, including without limitation all such material within the scope of patentable subject matter, or having ever been considered within the scope of patentable subject matter, or which might colorably be within the scope of patentable subject matter, notwithstanding most recent precedent.

The phrase "on its own initiative" (and similar phrases and terms) generally indicates that one or more devices or methods operate without instruction from an external source. For example and without limitation, a first device might operate "on its own initiative" if it acts responsive to data or instructions at that first device, or responsive to data or instructions accessible by that first device, or otherwise without being explicitly directed by a second devices.

The phrases and terms "pseudo-random," "random" (and similar phrases and terms) generally indicate any technique of any kind, in which information is generated or selected in a manner not predictable to the recipient. In the context of the invention, data, information, numbers, processes, or otherwise, referred to herein as "random," need not be equidistributed (or have any other particular distribution) over anything in particular, and might in general be pseudo-random in addition to, or in lieu of, being random.

The term "relatively" (and similar phrases and terms) generally indicates any relationship in which a comparison is possible, including without limitation "relatively less," "relatively more," and the like. In the context of the invention, where a measure or value is indicated to have a relationship "relatively," that relationship need not be precise, need not be well-defined, need not be by comparison with any particular or specific other measure or value. For example and without limitation, in cases in which a measure or value is "relatively increased" or "relatively more," that comparison need not be with respect to any known measure or value, but might be with respect to a measure or value held by that measurement or value at another place or time.

The term "substantially" (and similar phrases and terms) generally indicates any case or circumstance in which a determination, measure, value, or otherwise, is equal, equivalent, nearly equal, nearly equivalent, or approximately, what the measure or value is recited. The terms "substantially all" and "substantially none" (and similar phrases and terms) generally indicate any case or circumstance in which all but a relatively minor amount or number (for "substantially all") or none but a relatively minor amount or number (for "substantially none") have the stated property. The terms "substantial effect" (and similar phrases and terms) generally indicate any case or circumstance in which an effect might be detected or determined.

The phrases "this application," "this description" (and similar phrases and terms) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Real-World Nature

The invention includes techniques, including methods, physical articles, and systems, that receive real-world information dictated by real-world conditions (not mere inputs to a problem-solving technique). The techniques provided by the invention are transformative of the information received, at least in the sense that incoming data is received and distributed, and responses thereto are collected and aggregated. This has the effect that a 1st type of information (such as for example, widely distributed local states of individual nodes) is transformed into a 2nd type of information (such as for example, collected and aggregated global values reflecting those local states).

The invention includes techniques that are tied to a particular machine, at least in the sense that particular types of communication and computation, by particular types of devices, are performed in a communication network. While this description is primarily directed to that portion of the invention in which users make requests about, and receive responses about, the state of the network, there is no particular requirement for any such limitation. For example, users might direct designable connections to be made or broken, designable information to be collected and aggregated, and designable nodes to perform actions not necessarily otherwise in their instruction stream. This has the effect that interaction between and among elements of the claims systems, or between and among steps of the methods, as performed by devices acting separately, produces one or more advantageous effects.

FIGURES AND TEXT

FIG. 1 shows a diagram of a system 100, having elements shown in the FIGURE, including at least a network 110, a set of nodes 120, and a set of user stations 130.

NETWORK

The network 110 includes a set of communication links 111. Each communication link in might include any technique by which information can be sent from a first device to be received at a second device, such as a LAN, WAN, or other technique. For example, the communication links in might include local networks, direct communication links, or otherwise. In the context of the invention, there is no particular requirement that the communication links 111 are homogeneous. For example, it is contemplated that in many networks 110 the communication links in collectively include multiple distinct techniques for communication.

The communication links in include peer-to-peer communication links 111. In one embodiment, peer-to-peer communication links 111 are relatively fast and inexpensive links with relatively wide bandwidth.

The communication links 111 also include communication links in between a server and network nodes 120 (as described below). Most communication links in between the server and nodes 120 are substantially secure; however, one or more nodes 120 might be exposed to insecure environments and thus be assigned to a DMZ zone, as shown in the FIG. 1. Such insecure environments might include the possibility that the node 120 is physically accessible by unauthorized users (such as for example, workstations at user desks on a bank floor) or might be electronically accessible by unauthorized users (such as for example, workstations having unprotected access to the Internet). Communication links in between the server and such latter nodes 120 might be secured by requiring that they use particular selected port numbers, or other security techniques.

The communication links 111 also include communication links in between a server and user stations 130 (as described below), and communication links in between a server and server consoles, such as for example operator consoles directly controlling the server. Communication links in between the server and user stations 130 might use a SOAP protocol, or a variant thereof, or might use a different protocol usable with the techniques described herein. Communication links in between a server and server consoles might similarly be assigned to a DMZ zone, as shown in the FIG. 1.

In one embodiment, each communication link 111 is disposed to receive, transmit, and deliver one or more messages 112. A message 112 might be unicast or multicast, although usually messages 112 will be unicast from a first node 120 to a nearby node 120 in a local neighborhood (as described below). A message 112 will generally, but need not, include an indication of a header (such as for example a sender and one or more receivers) and a payload (such as for example information about the network 110, and as described in the incorporated information, a termination code or other information directing processing of the message 112). The message payload might include instructions or data to be delivered to one or more recipients. As described in the incorporated information, a message 112 might include a "registration" message 112, in which a node 120 informs a user station 130 of its presence in the network 110, an "instruction" message 112, in which a user station 130 directs a node 120 to perform some action (possibly including reporting on, or altering, data), a "reporting" message 112, in which a node 120 informs a user station 130 of selected data, a peer-to-peer message 112, in which a first node 120 sends information to a second node 120, and other types of messages 112.

As described herein, the network 110 includes one or more local neighborhoods 113. As described herein, a local neighborhood 113 for a particular node 120 typically includes those nearby nodes 120 preceding or following that particular node 120 in that particular node's orbit. A particular node's orbit, and thus its local neighborhood 113, might be broken by failed communication links in, by firewalls 114, or other communication obstructions which prevent a particular node 120 from communicating with those other nodes 120 having relatively nearby network addresses.

In alternative embodiments, the network no might include one or more subnets, such as for example LAN's or other relatively close-connected nodes 120. In such alternative embodiments, each LAN may include a subnet of nodes 120 with a common communication link in usable by substantially all those nodes 120 coupled to that LAN. In such alternative embodiments, at least some bridging, routing, or other nodes 120 might be coupled to more than one such subnet, with the effect that messages 112 might traverse multiple such subnets using those bridging, routing, or other nodes 120. Each node 120 might thus be able to identify a local region within the network no, in response to which subnets to which that node 120 is assigned, and in response to communication ability between or among multiple subnets. However, in the context of the invention, there is no particular requirement for any such use of subnets, use of LAN's as subnets, use of bridging devices between subnets, or any similar limitation. As further described herein, alternative embodiments include such subnets, but they are not required for use in the context of the invention.

Substantially each node 120 includes a computing device (such as for example one or more workstations or other general-purpose devices, one or more printers and or other peripherals, or otherwise). In one embodiment, each node 120 includes a processor 121, memory or mass storage 122, instructions and data directing the processor to perform operations, and one or more communication ports 123, the latter coupled to one or more of the communication links in, disposed to send and receive messages 112 between and among that particular node 120 and a set of nodes 120 distinct from that particular node 120.

In one embodiment, each particular node 120 is associated with a set of local nodes 120 distinct from that particular node 120 (in a local neighborhood 113 for that node 120, as described herein), for which communication between and among that particular node 120 and those local nodes 120 does not use substantial communication bandwidth from the network no. In one embodiment, as described herein, each node 120 communicates with those nodes 120 in a local neighborhood 113 within a relatively small range of a single orbit, such as for example, those nodes 120 nearby which follow or precede the selected node 120 in the orbit. Each node 120 might rarely communicate with the server.

User stations 130 are associated with users 131, and include input elements 132 (such as for example keyboards, pointing devices, voice command elements, or otherwise), and output elements 133 (such as for example audio or video presentation elements, or otherwise). In one embodiment, user stations 130 include a personal computing device (such as for example a desktop or laptop computer, a tablet computing device, a smartphone or PDA, or otherwise) having a processor 134, memory or mass storage 135, and instructions and data directing the processor to perform operations.

Network Management.

As described below, network management is performed substantially entirely by the nodes 120, each operating substantially concurrently. For some examples, nodes 120 might perform one or more of the following tasks:

Nodes 120 collect information, aggregate that information, and transfer that information to the server, which is coupled to the user stations 130.

Nodes 120 receive information from the server, which is coupled to the user stations 130, partition that information into sections, and distribute those sections within the network 110.

Nodes 120 receive instructions from the server, which is coupled to the user stations 130, distribute those instructions within the network 110, and execute those instructions where appropriate.

Among other effects, this has the effect that resource demands for management services on the network 110 and on user stations 130 are nearly zero, as each node 120 communicates only rarely with the server and primarily communicates with other nodes 120 in its local neighborhood 113. This has the effect that each node 120 uses only a relatively small amount of its capacity for management services. Moreover, user stations 130 are coupled to the server, which uses only relatively small amounts of its capacity for communication with nodes 120 or for data analysis.

This also has the effect that information is propagated from nodes 120 to the server to user stations 130 substantially in real time; this provides for status reports that are substantially accurate, for making network changes that are substantially atomic. The users 131 at the user stations 130 can manage the network dynamically.

User stations 130 are coupled to the server, which communicates with only a relatively small fraction of nodes 120, with the effect that user stations 130 can manage the network 110 using the peer-to-peer capacity of the set of nodes 120. In one embodiment, user stations 130 are not required to communicate directly with particular nodes 120 within the network 110; however, should that need arise, user stations 130 might be disposed for random-access communication with selected nodes 120, such as using a communication technique other than the peer-to-peer capacity of the set of nodes 120. For example, in alternative embodiments, user stations 130 are disposed for TCP/IP communication with selected nodes 120. However, in the context of the invention, there is no particular requirement for any direct communication between nodes 120 and user stations 130.

Self-Organization.

Orbits.

Each node 120, as it initiates operation, determines its position in the network 110.

In one embodiment, for example, as in the incorporated information, each node 120 might determine its IP address, with the nodes 120 ordering themselves in one or more "orbits" in which a first node 120 is followed by a second node 120, the second node being the node with the next-highest IP address.

Optionally, in such embodiments, nodes 120 might self-select, randomly according to a probability, which nodes should operate in "express" orbits, each express orbit providing a substantially smaller number of such nodes 120, but still accessing substantially all nodes 120 in the network 110 in substantially the same order. However, in the context of the invention, there is no particular requirement for "express" orbits, or any similar limitation. Nodes 120 might also determine other types of orbits, such as for example an orbit restricted to (or preferring) particular types of nodes 120 or restricted to (or preferring) particular types of communication links 111. In such embodiments, each node 120 might determine its local region in response to its position in an orbit, whether a base-level orbit, an express orbit, or otherwise.

As nodes 120 come online or go offline, each other node 120 might so determine, and adjust both the basic orbit (and possibly, the express orbits) accordingly. In one embodiment, when a first node 120 receives a message from a newly-only node 120, that first node 120 informs other nodes 120 in its neighborhood (previously in its orbit), with the effect that any nodes 120 that are earlier than than the newly-only node 120 can determine that the newly-only node 120 is in their neighborhood (further on in their orbit) and can begin communication with that newly-only node 120. Similarly, when that first node 120 sends a message to a newly-offline node 120 in its neighborhood, the newly-offline node 120 will fail to acknowledge (or otherwise respond) to that message, with the effect that the first node 120 can determine that the newly-offline node 120 is no longer available for communication.

Local Regions (Alternative).

In alternative embodiments, each node 120 might determine a different neighborhood of local nodes 120, such as for example all such nodes 120 associated with the same subnet, or within a selected number of subnet in hop-count distance (for example, all such nodes 120 within three hops from subnet to subnet). In such embodiments, this has the effect that each node 120 has a position in a metric space within the network no, such that each node 120 has a known, or at least determinable, hop-count distance from each other node 120. In the context of the invention, there is no particular requirement to use a fixed number of hops for hop-count locality; for example, the hop-count still considered "local" might vary depending upon other factors. In the context of the invention, there is no particular requirement to use hop-count as the measure, or the sole measure, of network distance. For example, nodes 120 might determine their position within a metric space within the network no in response to reliability of communication, relative availability of bandwidth, error-rate or latency or other measures of communication QoS, or otherwise.

Upon self-organization of the network no, each node 120 is substantially able to determine which other nodes 120 are within its particular local region, and is substantially able to communicate with other nodes 120 within its particular local region. Nodes 120 might communicate with other nodes 120 within their particular local region using a known protocol, such as TCP/IP or a variant thereof, or using a protocol specific to the system 100.

Collaborative Organization (Alternative).

In alternative embodiments, each node 120 need not select its local regions without reference to other nodes 120; for example, nodes 120 might operate collaboratively (such as for example identifying one or more nodes 120 for each subnet as representatives of that subnet) to determine a particular local region for each node 120.

Peer-to-Peer Privacy.

In one embodiment, nodes 120 might make communications private, such as using encryption and decryption of messages 112 or of message payloads. In one embodiment, encryption and decryption might use a public-key cryptosystem to assure privacy and accountability of messages 112, and a secure hash code to assure that messages 112 are tamper-evident. In the context of the invention, there is no particular requirement for any such limitation; for example, nodes 120 might use any form of encryption, encoding, chaffing, obfuscation, or other techniques.

In embodiments in which key distribution or certification authorities are involved, nodes 120 use the server as their certification authority, obtaining the server's public key (and possibly hash codes) to assure that data from the server is accurate and authentic. Nodes 120 can propagate the server's public key along orbits, or alternatively possibly using other communication links in.

In alternative embodiments, nodes 120 might self-organize the network 110 to determine those key distribution or certification authorities in a manner similar to their determination of local regions. For example, nodes 120 might randomly determine one or more base-level certification authorities for each such local region, determine wider-area local regions for each such set of certification authorities, determine one or more higher-level certification authorities for those base-level certification authorities, and similarly, with the effect of determining one or more certification authorities for the network 110 without substantially any external intervention. In such alternative embodiments, the server provides the certification authority for the network, with the effect that each node has direct access to those codes needed to authenticate information from other nodes. However, in the context of the invention, there is no particular need for use of multiple levels of any of: key distribution, certification, or other security techniques.

In one embodiment, queries from user stations 130, data and instructions, information to be sent to user stations 130, and other communications between and among nodes 120 and user stations 130, are maintained confidential to only those nodes 120 and only those user stations 130 (and their users 131) who are appropriately authenticated and authorized. For example, data and instructions might be encrypted using a public key for each node 120 for which those data and instructions are intended. However, in the context of the invention, there is no particular requirement for encryption of data directed to particular nodes 120, as each particular node 120 receiving such data or instructions can determine, using a local client application, whether those data or instructions are intended for that particular node 120.

In one embodiment, particular users 131 at user stations 130 might be authorized for only a subset of possible management functions. For some examples, some users 131 might be authorized to perform one or more of the following tasks:

Some users 131 might only be authorized to review the number of assets assigned to particular uses (such as for example, monitoring whether license usage is within contract limits for the network no).

Some users 131 might only be authorized to review whether there are unusual system events ongoing (such as for example, malware spreading in the network no).

Some users 131 might only be authorized to upgrade software applications (such as for example, software applications obtained from designated vendors).

Some users 131 might only be authorized to make other identified changes to the network 110 (such as for example reallocating assets from one department to another).

Other and further authorization types might be identified.

In such embodiments, particular users 131 at user stations 130 might each be associated with distinct sets of authorized rights.

Scanners.

In one embodiment, the nodes 120 each attempt to scan their local region of the network for managerial information. In alternative embodiments, a selected subset of nodes 120, sometimes called "scanners" herein, are assigned this task. However, in the context of the invention, there is no particular requirement for limiting the set of scanners to much fewer than substantially all such nodes 120. In such alternative embodiments where not all nodes 120 are scanners, the scanners might be changed from time to time, with the effect that no individual node 120 need be excessively burdened with this task.

That managerial information might include one or more of the following:

Identities and locations of communication links in that are not known to any user station 130.

Identities and locations of communication links in that are not working, that are unreliable, that lack adequate bandwidth capacity, that lag excessively or fail to meet other measures of communication QoS, or otherwise.

Identities and locations of communication links in that otherwise violate rules set by a network administrator (such as for example are in excessive use, or otherwise).

Identities and locations of nodes 120 that have not identified themselves to any user station 130.

Identities and locations of nodes 120 that are crashed, disconnected, or otherwise not working or not adequately working.

Identities and locations of nodes 120 that have missing application software (such as for example anti-virus software or other malware prevention that is not installed), or which have application software that was installed improperly or incompletely, which was removed, or which has improper settings (such as for example network browsers that are set with excessively loose security constraints).

Identities and locations of nodes 120 whose authentication is outdated, or has been modified or revoked by their certification authority.

Identities and locations of nodes 120 that otherwise violate rules set by a network administrator (such as for example that have been altered from an acceptable configuration by their user, or have installed game software, or maintain personal files, or otherwise).

In one embodiment, each scanners is assigned to look only at a relatively small portion of the network 110. For example, a node 120 assigned as a scanner might be directed to look for nodes 120 in its local neighborhood 113, such as those nodes 120 preceding it or following it in its orbit. As described herein, nodes 120 might easily determine those nodes 120 newly-arrived in the network 110, or those nodes 120 newly-departed from the network 110. Similarly, nodes 120 might easily determine those communication links 111 or nodes 120 having the properties described just above, or other properties.

Scanners need not be limited to their local neighborhood 113. For example, scanners might be assigned to continue looking for nodes 120 until they find something worthwhile to report. Alternatively, scanners might be assigned to look for nodes 120 at distances which vary in response to factors about the network 110, such as for example how effectively the network 110 is currently operating, or for example what fraction of nodes 120 are currently assigned to operate as scanners.

While each individual scanning node does not need to review any large portion of the network, collectively those scanning nodes can cover the entire network, having the effect of revealing any such deficient links or nodes with relatively little resource use. This has the effect of providing a substantial advantage over those known methods which scan the entire network from a central location (or a set of central locations, such as a hierarchy of central locations). In such known methods, a relatively large amount of traffic is communicated between those central locations and leaf nodes of the network, with the effects of (1) taking a relatively large amount of time to perform such a scan, (2) taking up relatively large amounts of resources to perform a scan, (3) occupying network resources that would otherwise be devoted to operations. Accordingly, in such known methods, scanning is performed relatively rarely, while in the context of the invention, scanning can be performed in substantially real time.

Shards.

As noted above, user stations 130 might upload large data units to the server. In such cases, the server downloads those data units (or fractions thereof) to selected nodes 120, with the effect that the server can download those data units to the nodes 120 using only a relatively few communication links 111. Similarly, user stations 130 might download large data units from the server. In such cases, the server receives those data units from selected nodes 120 (which might be self-selected, such as for example in cases where nodes 120 have information to report to the server). This has the effects that the server need not be burdened with substantial communication for download or upload, and that relatively few communication links in need be burdened with use for download or upload.

Such data units are broken into individual shards, which are distributed throughout the network (or aggregated from within the network) using peer-to-peer communication. For example, if a data unit (such as for example an application software update) includes 5 Gigabytes of data and instructions, distributing that data unit to thousands of individual nodes 120 would involve a relatively large amount of communication bandwidth. In such an example, the data unit might be broken into 5,000 shards, each only 1 Megabyte, with the server downloading that entire data unit to only a relatively few nodes 120.

Each such node 120 receiving the data unit maintains a fraction of the shards associated with that data unit 120, The node 120 communicates the data unit (or its portion thereof) to a following node in its local neighborhood 113. However, in the context of the invention, there is no particular requirement for using such other definitions. This has the effect that the server need only download the data unit a relatively few times, to successfully deliver the data unit into the network 110.

Each node selects the shards it maintains independently of whether those shards are maintained by other nodes, with the effect that if a fraction of the network is not operational, not reachable, or otherwise incapacitated, the likelihood that at least one copy of each shard is maintained in that remaining fraction of the network that is operational and reachable is independent of the nature of whatever failure mode occurred. All nodes coupled to that subnet have relatively easy access to all shards within their own neighborhood, so it is generally adequate for a neighborhood to maintain only a few copies of each such shard. If a particular neighborhood is missing a shard, its nodes can request that shard from the server or from other neighborhoods, with the effect of distributing or collecting data for communication with user stations with relatively little resource use.

Those relatively large data units might include one or more of the following:

Data or instructions (such as for example FAQ's, as described below), to be distributed from user stations 130 to relatively large numbers of nodes 120.

Historical data relating to operations or transactions occurring on communication links 111 or nodes 120, to be reported to user stations 130.

Un-aggregated query results, collected from relatively large numbers of nodes 120, and to be reported to user stations 130.

Updates to software applications, to be distributed from user stations 130 to relatively large numbers of nodes 120.

Each node 120 maintains a record of which shards it has collected from the data unit. When a node 120 has all shards from the data unit, it can cease receiving shards (but might continue redistributing those shards to other nodes 120 within its own local neighborhood 113 in its orbit). As all nodes within a local neighborhood 113 in its orbit have relatively easy access to shards from other nodes within that local neighborhood 113, redistribution of shards within that local neighborhood 113 is also relatively easy.

When a node 120 has waited a sufficient time without receiving all shards from the data unit, it might send a request to the server, requesting or sending the missing shards for the data unit, having the effect of downloading (sending data from user stations 130 to distribute to the network 110) or uploading (sending data collected from the network 110 to user stations 130) for communication with user stations 130 with relatively little resource use and in a significantly shorter time.

Audit Rules.

A particular set of relatively frequently-asked network queries, sometimes called "FAQ's" herein, are automatically executed from time to time by one or more nodes 120 within the network 110. In one embodiment, those FAQ's are automatically injected into the network, as if they were requested from time to time by user stations 130. For FAQ's to be "automatically injected," they might actually be injected into to the network 110 from one or more user stations 130, or they might be maintained at one or more local nodes 120, from which they are revivified from time to time to be re-executed. In the context of the invention, there is no particular requirement for either of these limitations. For example, FAQ's might be maintained in a database, either external or internal to the network 110, from which nodes 120 read those FAQ's and re-execute them from time to time.

Upon re-execution, responses to these FAQ's are uploaded to one or more user stations 130, where those responses are cached. In the context of the invention, there is no particular requirement for this limitation; for example, user stations 130 might maintain those responses in a database to which they have access. User stations 130 maintain a user interface, which includes a dashboard that presents those cached responses to users 131. The dashboard might present some or all of the cached responses, some or all of the most recent such cached responses, or might present those cached responses to users 131 upon their request.

This has the effect that many such queries need not be initiated by users, as answers are already maintained available on the dashboard. Dashboards are configurable by users, with the effect that users can maintain a view of relatively fresh responses to such FAQ's with less latency than if those FAQ's were initiated only when a response was desired. Since information collection is performed in parallel and distributed among leaf nodes of the network, relatively little resource use need be expended, with the effect that network stations can present the answers to many such FAQ's in real time. Similarly, computations responsive to those answers can be maintained on the dashboard, including aggregate values from multiple such queries, trend lines, and other statistical information.

Similarly, a set of audit or compliance rules are also automatically injected into the network from time to time, possibly using a similar technique. This has the effect that those rules are also performed in parallel by nodes as if they were explicitly instructed by network users. Known auditing and compliance schemas typically have dozens or even hundreds of such rules, each of which is intended to assure that the network is operating within strictures imposed by regulation, contract, or administrative policy. The following are some examples of some possible audit or compliance rules:

It might be a contract requirement for the enterprise operating the network that they have no more than 5,000 copies of Microsoft Excel in use at any instant.

It might be a regulatory requirement for the enterprise operating the network that at least 99% of all nodes 120 within the network 110 have current versions of antivirus software installed.

Since information collection and distribution is performed in parallel and distributed among leaf nodes of the network, relatively little resource use need be expended, both (1) to determine that the network is in compliance, and (2) to assure that network nodes attempting to initiate excess uses are disallowed from doing so.

Network Debugging.

Help Desk Operation.

In one embodiment, a user station 130 might be assigned to a "help desk" function, in which a user 131 associated with that user station 130 is tasked with the assignment of receiving requests for help from users of nodes 120 within the network 110, and of solving any problems associated with those requests for help. When a help desk receives a request for help, the help desk operator (that is, a user 131 tasked with the assignment of being a help desk operator) injects a query into the network 110, asking nodes 120 within the network 110 to determine a prevalence of the problem associated with the request for help. For example, one common problem is that users at nodes 120 within the network 110 might discover one day that they are unable to access a peripheral within the network 110 (such as for example, a printer) that they were able of access the day before.

In response to the query injected by the help desk operator, nodes 120 within the network 110 determine a prevalence of the problem associated with the request for help. For example, the system 100 might use techniques such as those described in the incorporated information, in which prevalence of a network problem can be determined in response to the local states of nodes 120 within the network 110. In response to the prevalence of the problem, the help desk operator reports an evaluation of seriousness to a network engineer (that is, a user 131 tasked with the assignment of being a network engineer). In response to the help desk operator's evaluation of seriousness, the network engineer can assign a priority to solving the problem.

In response to a priority to solving the problem, the network engineer injects an instruction to the network 110 (that is, a message 112 including data and instructions to be executed by nodes 120 in the network no) to correct the problem. This has the effect that network engineers can assign relatively early solutions to those network problems that help desk operators have assigned relatively high priority.

Network Outages.

Similarly, in one embodiment, one or more users at nodes 120 within the network 110 might report that all or part of the network 110 is not operational. This might include lack of communication within the network 110, lack of communication between the network 110 and an external source or destination, lack of operation of some or all of the nodes 120 within the network 110, or otherwise.

As noted above, scanners might determine which nodes 120 within the network 110 are not operational or otherwise, or for which communication is unavailable, compromised, or otherwise. This has the effect that a network manager (such as for example a user 131 at a user station 130 tasked with the assignment of managing the network no) can determine one or more sources of the network outage.

Similarly to techniques noted above, one or more network engineers can inject instructions to the network 110 (to be executed by nodes 120 in the network 110, possibly including any particular node 120 capable of responding to an instruction message 112, even if that particular node 120 is not otherwise operational) to ameliorate the network outage. In one embodiment, network engineers continue to inject instructions until the network outage is completely ameliorated, that is, fixed.

Similarly to techniques noted above, one or more network managers can inject queries to the network 110 (such as for example, which might be FAQ's presented at one or more dashboards at user stations 130), to confirm that the instructions injected into the network 110 have been executed, that the sources of the network outage have been ameliorated, and that the network 110 is once again operational. These techniques have the effect that network outages can be (1) identified and diagnosed, (2) corrected, or at least ameliorated, and (3) confirmed that the correction has been performed.

The invention claimed is:

1. A method, including:

in a computer network having a plurality of nodes, wherein each said node comprises a respective computing device and has a respective defined location in a linearly ordered sequence of said plurality of nodes, wherein the linearly ordered sequence includes a plurality of local segments, each local segment including a 1st said node followed by a sequence of 2nd said nodes in the local segment, wherein at least a portion of the linearly ordered sequence is separated into two or more local segments by one or more firewalls, and wherein the 1st said node and each 2nd said node in the local segment includes a respective communication link to a respective next node in the linearly ordered sequence:

at the 1st said node of a respective local segment, injecting a query regarding a set of management information associated with the local segment, the query designating, by specifying a first shared node property, a first subset of nodes in the local segment to respond to the query, wherein the query is forwarded along the local segment through the respective communication links of the 1st said node and the sequence of 2nd said nodes following the 1st said node;

wherein each node of the first subset of nodes having the first shared node property responds to the query by aggregating its respective local information to any answers already accumulated in the query; and wherein at least one of the sequence of 2nd nodes sends a report message containing aggregated management information collected from the first subset of nodes in response to the query.

2. The method of claim 1, further comprising:

at the 1st said node of a respective local segment, injecting a command specifying a set of operations to be executed by a second subset of nodes in the local segment, the command designating the second subset of nodes by specifying a second shared node property for the second subset of nodes, wherein the command is forwarded along the local segment through the respective communication links of the 1st said node and the sequence of 2nd said nodes following the 1st said node; and wherein each node of the second subset of nodes having the second shared node property executes the set of operations in response to the command.

3. The method of claim 1, wherein the plurality of nodes self-organize into the linearly ordered sequence in accordance with a sequential order of their respective hardware addresses.

4. The method of claim 1, wherein the query is selected from a set of frequently-asked network queries and automatically injected into the network at multiple times.

5. The method of claim 1, wherein the query is selected from a set of audit or compliance rules and automatically injected into the network at multiple times.

6. The method of claim 1, wherein the plurality of nodes further self-organize into one or more express orbits, each express orbit including a respective subset of the plurality of nodes and organized in substantially the same order as the linearly ordered sequence.

7. A non-transitory computer-readable medium having instructions stored thereon, the instructions, when executed by one or more processors, cause the processors to perform operations comprising:

in a computer network having a plurality of nodes, wherein each said node comprises a respective computing device and has a respective defined location in a linearly ordered sequence of said plurality of nodes, wherein the linearly ordered sequence includes a plurality of local segments, each local segment including a 1st said node followed by a sequence of 2nd said nodes in the local segment, wherein at least a portion of the linearly ordered sequence is separated into two or more local segments by one or more firewalls, and wherein the 1st said node and each 2nd said node in the local segment includes a respective communication link to a respective next node in the linearly ordered sequence:

at the 1st said node of a respective local segment, injecting a query regarding a set of management information associated with the local segment, the query designating, by specifying a first shared node property, a first subset of nodes in the local segment to respond to the query, wherein the query is forwarded along the local segment through the respective communication links of the 1st said node and the sequence of 2nd said nodes following the 1st said node;

wherein each node of the first subset of nodes having the first shared node property responds to the query by aggregating its respective local information to any answers already accumulated in the query; and wherein at least one of the sequence of 2nd said nodes sends a report message containing aggregated management information collected from the first subset of nodes in response to the query.

8. The computer-readable medium of claim 7, wherein the operations further comprise:

at the 1st said node of a respective local segment, injecting a command specifying a set of operations to be executed by a second subset of nodes in the local segment, the command designating the second subset of nodes by specifying a second shared node property for the second subset of nodes, wherein the command is forwarded along the local segment through the respective communication links of the 1st said node and the sequence of 2nd said nodes following the 1st said node; and wherein each node of the second subset of nodes having the second shared node property executes the set of operations in response to the command.

9. The computer-readable medium of claim 7, wherein the query is selected from a set of frequently-asked network queries and automatically injected into the network at multiple times.

10. The computer-readable medium of claim 7, wherein the plurality of nodes further self-organize into one or more express orbits, each express orbit including a respective subset of the plurality of nodes and organized in substantially the same order as the linearly ordered sequence.

11. A system, comprising:

one or more processors; and memory having instructions stored thereon, the instructions, when executed by the one or more processors, cause the processors to perform operations comprising:

in a computer network having a plurality of nodes, wherein each said node comprises a respective computing device and has a respective defined location in a linearly ordered sequence of said plurality of nodes, wherein the linearly ordered sequence includes a plurality of local segments, each local segment including a 1st said node followed by a sequence of 2nd said nodes in the local segment, wherein at least a portion of the linearly ordered sequence is separated into two or more local segments by one or more firewalls, and wherein the 1st said node and each 2nd said node in the local segment includes a respective communication link to a respective next node in the linearly ordered sequence:

at the 1st said node of a respective local segment, injecting a query regarding a set of management information associated with the local segment, the query designating, by specifying a first shared node property, a first subset of nodes in the local segment to respond to the query, wherein the query is forwarded along the local segment through the respective communication links of the 1st said node and the sequence of 2nd said nodes following the 1st said node;

wherein each node of the first subset of nodes having the first shared node property responds to the query by aggregating its respective local information to any answers already accumulated in the query; and wherein at least one of the sequence of 2nd said nodes sends a report message containing aggregated management information collected from the first subset of nodes in response to the query.

12. The system of claim 11, wherein the operations further comprise:

at the 1st said node of a respective local segment, injecting a command specifying a set of operations to be executed by a second subset of nodes in the local segment, the command designating the second subset of nodes by specifying a second shared node property for the second subset of nodes, wherein the command is forwarded along the local segment through the respective communication links of the 1st said node and the sequence of 2nd said nodes following the 1st said node; and wherein each node of the second subset of nodes having the second shared node property executes the set of operations in response to the command.

13. The system of claim 11, wherein the plurality of nodes self-organize into the linearly ordered sequence in accordance with a sequential order of their respective hardware addresses.

14. The system of claim 11, wherein the query is selected from a set of frequently-asked network queries and automatically injected into the network at multiple times.

15. The system of claim 11, wherein the query is selected from a set of audit or compliance rules and automatically injected into the network at multiple times.

16. The system of claim 11, wherein the plurality of nodes further self-organize into one or more express orbits, each express orbit including a respective subset of the plurality of nodes and organized in substantially the same order as the linearly ordered sequence.

17. A method, including:
   in a computer network having a plurality of nodes, wherein each said node comprises a respective computing device and has a respective defined location in a linearly ordered sequence of said plurality of nodes, wherein the linearly ordered sequence includes a plurality of local segments, each local segment including a 1st said node followed by a sequence of 2nd said nodes in the local segment, wherein the plurality of nodes further self-organize into one or more express orbits, each express orbit including a respective subset of the plurality of nodes and organized in substantially the same order as the linearly ordered sequence, and wherein the 1st said node and each 2nd said node in the local segment includes a respective communication link to a respective next node in the linearly ordered sequence:
      at the 1st said node of a respective local segment, injecting a query regarding a set of management information associated with the local segment, the query designating, by specifying a first shared node property, a first subset of nodes in the local segment to respond to the query,
      wherein the query is forwarded along the local segment through the respective communication links of the 1st said node and the sequence of 2nd said nodes following the 1st said node;
      wherein each node of the first subset of nodes having the first shared node property responds to the query by aggregating its respective local information to any answers already accumulated in the query; and
      wherein at least one of the sequence of 2nd nodes sends a report message containing aggregated management information collected from the first subset of nodes in response to the query.

18. The method of claim 17, further comprising:
   at the 1st said node of a respective local segment, injecting a command specifying a set of operations to be executed by a second subset of nodes in the local segment, the command designating the second subset of nodes by specifying a second shared node property for the second subset of nodes,
      wherein the command is forwarded along the local segment through the respective communication links of the 1st said node and the sequence of 2nd said nodes following the 1st said node; and
      wherein each node of the second subset of nodes having the second shared node property executes the set of operations in response to the command.

19. The method of claim 17, wherein the plurality of nodes self-organize into the linearly ordered sequence in accordance with a sequential order of their respective hardware addresses.

20. The method of claim 17, wherein the query is selected from a set of frequently-asked network queries and automatically injected into the network at multiple times.

21. The method of claim 17, wherein the query is selected from a set of audit or compliance rules and automatically injected into the network at multiple times.

22. A non-transitory computer-readable medium having instructions stored thereon, the instructions, when executed by one or more processors, cause the processors to perform operations comprising:
   in a computer network having a plurality of nodes, wherein each said node comprises a respective computing device and has a respective defined location in a linearly ordered sequence of said plurality of nodes, wherein the linearly ordered sequence includes a plurality of local segments, each local segment including a 1st said node followed by a sequence of 2nd said nodes in the local segment, wherein the plurality of nodes further self-organize into one or more express orbits, each express orbit including a respective subset of the plurality of nodes and organized in substantially the same order as the linearly ordered sequence, and wherein the 1st said node and each 2nd said node in the local segment includes a respective communication link to a respective next node in the linearly ordered sequence:
      at the 1st said node of a respective local segment, injecting a query regarding a set of management information associated with the local segment, the query designating, by specifying a first shared node property, a first subset of nodes in the local segment to respond to the query,
      wherein the query is forwarded along the local segment through the respective communication links of the 1st said node and the sequence of 2nd said nodes following the 1st said node;
      wherein each node of the first subset of nodes having the first shared node property responds to the query by aggregating its respective local information to any answers already accumulated in the query; and
      wherein at least one of the sequence of 2nd said nodes sends a report message containing aggregated management information collected from the first subset of nodes in response to the query.

23. The computer-readable medium of claim 22, wherein the operations further comprise:
   at the 1st said node of a respective local segment, injecting a command specifying a set of operations to be executed by a second subset of nodes in the local segment, the command designating the second subset of nodes by specifying a second shared node property for the second subset of nodes,
      wherein the command is forwarded along the local segment through the respective communication links of the 1st said node and the sequence of 2nd said nodes following the 1st said node; and
      wherein each node of the second subset of nodes having the second shared node property executes the set of operations in response to the command.

24. The computer-readable medium of claim 22, wherein the query is selected from a set of frequently-asked network queries and automatically injected into the network at multiple times.

25. A system, comprising:
   one or more processors; and
   memory having instructions stored thereon, the instructions, when executed by the one or more processors, cause the processors to perform operations comprising:
      in a computer network having a plurality of nodes, wherein each said node comprises a respective computing device and has a respective defined location in a linearly ordered sequence of said plurality of nodes, wherein the linearly ordered sequence includes a plurality of local segments, each local segment including a 1st said node followed by a sequence of 2nd said nodes in the local segment, wherein the plurality of nodes further self-organize into one or more express orbits, each express orbit including a respective subset of the plurality of nodes and organized in substantially the same order as the linearly ordered sequence, and wherein the 1st said node and each 2nd said node in the local segment includes a respective communication link to a respective next node in the linearly ordered sequence:

at the 1st said node of a respective local segment, injecting a query regarding a set of management information associated with the local segment, the query designating, by specifying a first shared node property, a first subset of nodes in the local segment to respond to the query, wherein the query is forwarded along the local segment through the respective communication links of the 1st said node and the sequence of 2nd said nodes following the 1st said node;

wherein each node of the first subset of nodes having the first shared node property responds to the query by aggregating its respective local information to any answers already accumulated in the query; and wherein at least one of the sequence of 2nd said nodes sends a report message containing aggregated management information collected from the first subset of nodes in response to the query.

26. The system of claim 25, wherein the operations further comprise:

at the 1st said node of a respective local segment, injecting a command specifying a set of operations to be executed by a second subset of nodes in the local segment, the command designating the second subset of nodes by specifying a second shared node property for the second subset of nodes, wherein the command is forwarded along the local segment through the respective communication links of the 1st said node and the sequence of 2nd said nodes following the 1st said node; and wherein each node of the second subset of nodes having the second shared node property executes the set of operations in response to the command.

27. The system of claim 25, wherein the plurality of nodes self-organize into the linearly ordered sequence in accordance with a sequential order of their respective hardware addresses.

28. The system of claim 25, wherein the query is selected from a set of frequently-asked network queries and automatically injected into the network at multiple times.

29. The system of claim 25, wherein the query is selected from a set of audit or compliance rules and automatically injected into the network at multiple times.

* * * * *